United States Patent [19]

Cianciosi et al.

[11] Patent Number: 5,479,175
[45] Date of Patent: Dec. 26, 1995

[54] METHOD AND APPARATUS FOR ENHANCING DISCHARGED AREA DEVELOPED REGIONS IN A TRI-LEVEL PRINGING SYSTEM

[75] Inventors: Michael S. Cianciosi; Robert P. Loce, both of Rochester; Martin E. Banton, Fairport; Ronald E. Jodoin, Pittsford, all of N.Y.

[73] Assignee: Xerox Corporation, Stamford, Conn.

[21] Appl. No.: 118,923

[22] Filed: Sep. 10, 1993

[51] Int. Cl.⁶ ..................................... H04N 1/21
[52] U.S. Cl. .................... 347/252; 347/135; 358/298
[58] Field of Search ...................... 358/298, 296, 358/300, 302; 347/131, 135, 252, 251, 247, 255

[56] References Cited

U.S. PATENT DOCUMENTS

| | | | |
|---|---|---|---|
| 4,347,523 | 8/1982 | Ohara | 346/108 |
| 4,375,065 | 2/1983 | Ohara | 346/108 |
| 4,390,882 | 6/1983 | Ohara et al. | 346/1.1 |
| 4,437,122 | 3/1984 | Walsh et al. | 358/166 |
| 4,544,264 | 10/1985 | Bassetti et al. | 355/14 R |
| 4,544,922 | 10/1985 | Watanabe et al. | 340/728 |
| 4,625,222 | 11/1986 | Bassetti et al. | 346/160 |
| 4,626,923 | 12/1986 | Yoshida | 353/283 |
| 4,661,859 | 4/1987 | Mailloux et al. | 358/283 |
| 4,847,641 | 7/1989 | Tung | 346/154 |
| 4,905,023 | 2/1990 | Suzuki | 346/108 |
| 4,926,268 | 5/1990 | Kawamura et al. | 358/458 |
| 4,933,689 | 6/1990 | Yoknis | 346/154 |
| 4,965,672 | 10/1990 | Duke et al. | 358/298 |
| 5,005,139 | 4/1991 | Tung | 364/519 |
| 5,041,848 | 8/1991 | Gilbert et al. | 346/108 |
| 5,134,495 | 7/1992 | Frazier et al. | 358/298 |
| 5,138,339 | 8/1992 | Curry et al. | 346/108 |
| 5,144,337 | 9/1992 | Imamura et al. | 346/108 |
| 5,144,338 | 9/1992 | Sakano | 346/108 |
| 5,184,226 | 2/1993 | Cianciosi | 358/296 |
| 5,193,008 | 3/1993 | Frazier et al. | 358/298 |
| 5,193,011 | 3/1993 | Dir et al. | 358/455 |
| 5,223,857 | 6/1993 | Loce et al. | 346/108 |
| 5,260,799 | 11/1993 | Loce et al. | 347/135 |
| 5,369,423 | 11/1994 | Hunter et al. | 347/255 |

FOREIGN PATENT DOCUMENTS 0361538 of 0000 European Pat. Off. ........ H04N 1/411

OTHER PUBLICATIONS

Richard Johnson et al., "Scophony Spatial Light Modulator", *Optical Engineering*, vol. 24, No. 1, Jan./Feb. 1985.
L. Steidel, "Technology Overview: Resolution Enhancement Technologies for Laser Printers", *LaserMaster Corp.*

*Primary Examiner*—Mark J. Reinhart
*Attorney, Agent, or Firm*—Duane C. Basch

[57] ABSTRACT

The present invention is a an apparatus for enhancing the output along edges of discharged area developed regions in a tri-level imaging system employing a pulse width and position modulated signal ROS for exposure. The invention enables the identification and selective alteration of video data used to drive the ROS so as to extend the developed regions by a selected amount and eliminate digitization artifacts present in the image to be printed. The extension of the discharged area developed regions is accomplished by extending the width of, or adding separate, exposure pulses in adjacent areas to enable development within a portion of those regions.

18 Claims, 8 Drawing Sheets

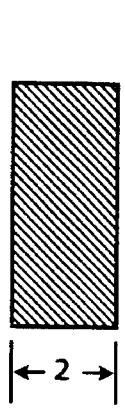
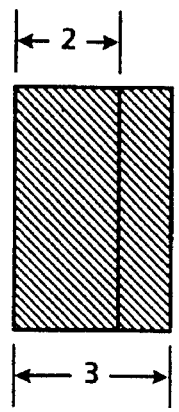
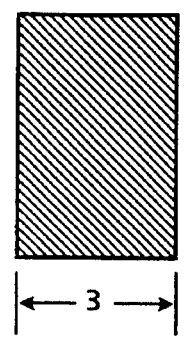
FIG.2A    FIG.2B    FIG.2C
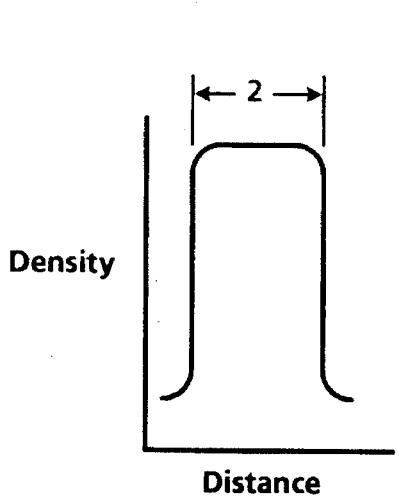
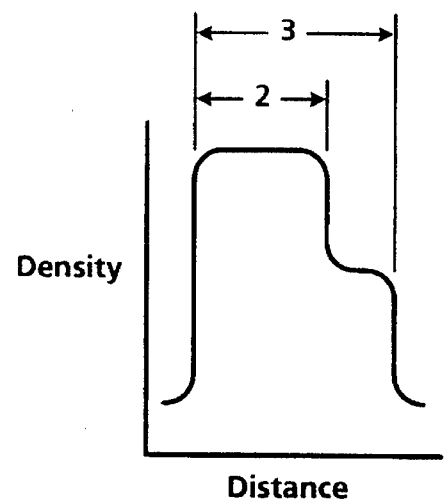
FIG.3A    FIG.3B
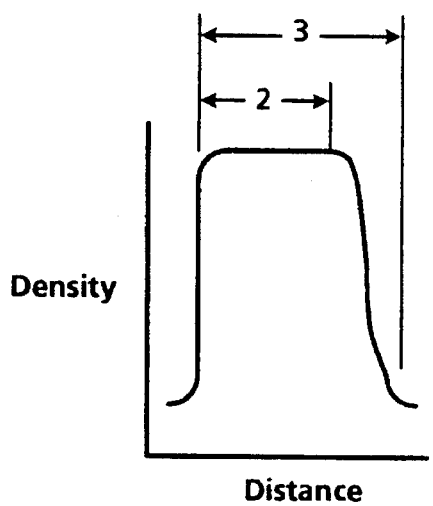
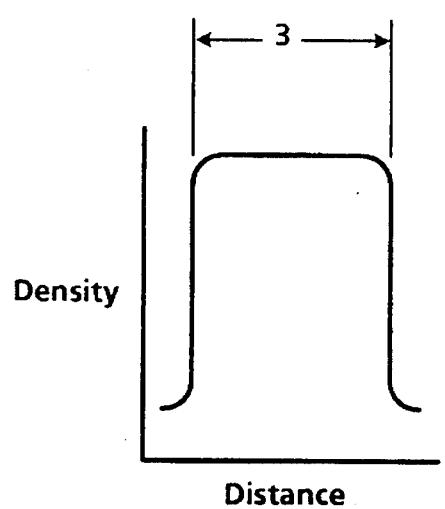
FIG.3C    FIG.3D

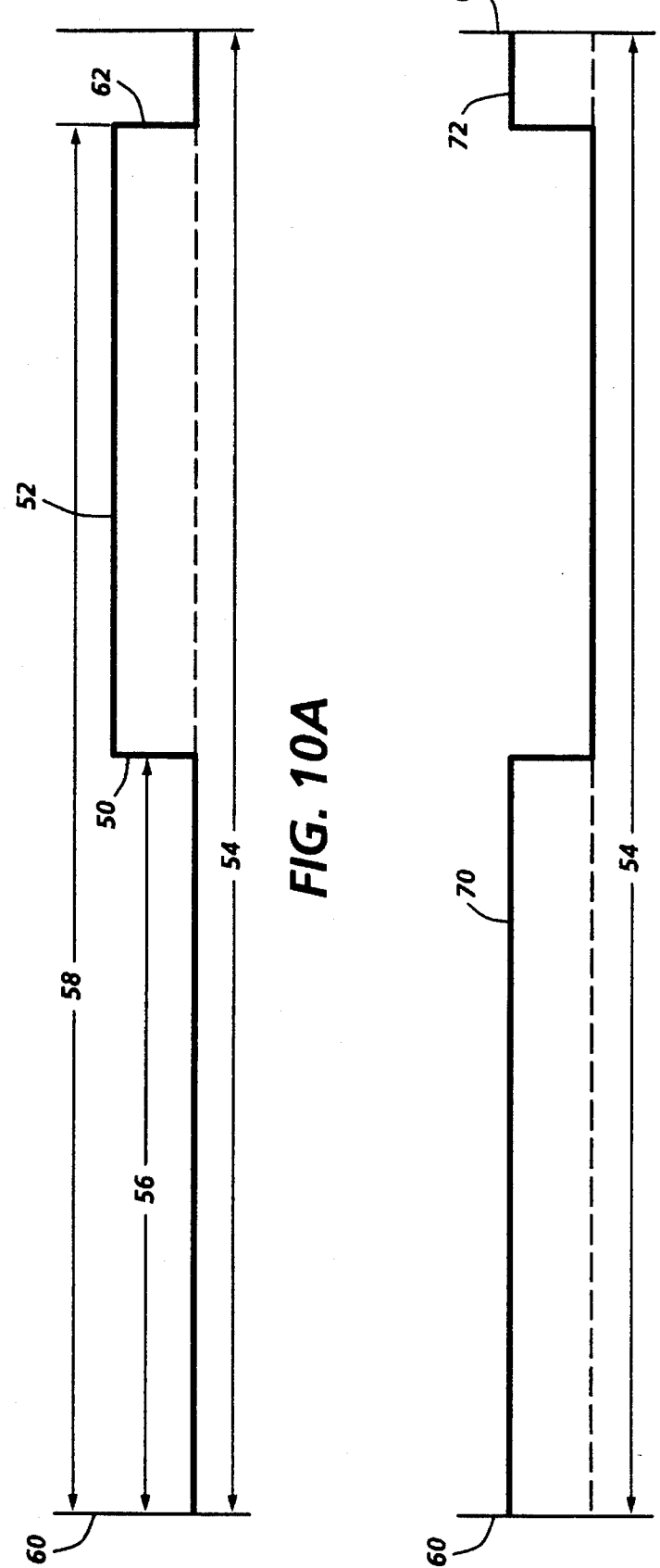

METHOD AND APPARATUS FOR ENHANCING DISCHARGED AREA DEVELOPED REGIONS IN A TRI-LEVEL PRINGING SYSTEM

This invention relates generally to an apparatus for enhancing regions of an image output by a digital printing system, and more particularly to an enhancement system which alters the digital image signals used to drive a pulse width modulated printing exposure device in a tri-level xerographic printer.

CROSS-REFERENCE

The following related applications are hereby incorporated by reference for their teachings:

Pulsed Imaging, Pulse Width Modulated Scanner for a Tri-Level Highlight Color Imaging System" by Swanberg et al., Ser. No. 07/756,643, filed Sep. 9, 1991.

"Apparatus for Enhancing Pixel Addressability in a Pulse Width and Position Modulated System" by Cianciosi et al., Ser. No. 08/118,858, filed concurrently herewith.

BACKGROUND AND SUMMARY OF THE INVENTION

The present invention may be used in a tri-level printing system that utilizes a pulse width modulated raster output scanner (ROS) to produce a tri-level latent image such as the Xerox 4850 Highlight Color Laser Printing System. The tri-level latent image produced in such a system is developed and transferred to an output sheet or similar print medium. In tri-level or highlight color imaging, unlike conventional xerography, upon exposure, three charge levels are produced on the charge-retentive surface. The highly charged (i.e. unexposed) areas are developed with toner, and the area most fully discharged is also developed, but with a toner of a different color, referred to as the highlight color. The charge retentive surface is exposed at three levels; zero exposure, intermediate exposure, and full exposure, which correspond to three charge levels. The three resulting charge levels can be developed to print, for example, black, white, and a single color.

As described in U.S. patent application Ser. No. 07/756,643, the relevant portions of which are hereby incorporated by reference, charged portions of a photoreceptor surface are advanced through an exposure station. Briefly, at the exposure station the photoreceptor surface is exposed by a tri-level ROS unit which causes the surface to be discharged in accordance with the output from an image source. This scan produces three separate discharge regions on the photoreceptor, each region exposed at one of three possible levels: (1) zero exposure which results in a voltage equal to the photoreceptor dark-decay potential and will be developed using charged area development (CAD); (2) full exposure, which results in a low voltage level and is developed using discharged area development (DAD); and (3) intermediate exposure, which yields an intermediate voltage level that does not result in development by CAD or DAD, yielding a background region on the print. Subsequent to development, the developed image is transferred and fused to the print medium using techniques commonly known for tri-level xerographic printing systems.

Heretofore, various methods and apparatus have been used to control and enhance the output of ROS based printing systems. Moreover, several scanning techniques are known to obtain tri-level exposure imaging. To obtain higher spatial resolution, a pulsed imaging scanner can be utilized. This pulsed imaging scanner is also referred to as a Scophony scanner in an article in Optical Engineering, Vol. 24, No. 1, January/February 1985, *Scophony Spatial Light Modulator*, by Richard Johnson et al., whose contents are hereby incorporated by reference. The following disclosures may be relevant:

U.S. Pat. No. 4,347,523, also to Ohara, discloses an apparatus of general interest which uses an input signal to address pulse numbers with corresponding pulse width selection numbers.

U.S. Pat. No. 4,375,065 to Ohara describes an apparatus of general interest that uses pulse number and pulse position modulation to control a laser beam.

U.S. Pat. No. 4,390,882 to Ohara et al. discloses for an image processing apparatus a method of adjusting the image density by controlling the on time of the laser. Control of the laser on time is performed by a multivibrator having a variable RC time constant.

U.S. Pat. No. 4,437,122 to Walsh et al. teaches an improved method of converting low resolution images into images of higher resolution for printing so as to simultaneously increase density and smooth character edges. In a CRT display or hardcopy output apparatus, the invention is accomplished by converting an original pixel into a higher resolution 3×3 enhanced representation. The status of each of the nine elements in the enhanced representation is determined as a result of an examination of the neighboring pixels of the original pixel.

U.S. Pat. Nos. 4,544,264 and 4,625,222, both issued to Bassetti et al. describe enhancement circuits suitable for use in a laser based electrophotographic printing machine. The enhancements are directed at modifying the digital drive signals used to produce the image, including smoothing digitized edges and broadening fine lines in both the horizontal and vertical directions. Leading and trailing edge signals, in both directions are provided to potentially print each black pixel or line as a series of three pixels, a gray leading pixel, overlapped by a central black pixel, which is in turn overlapped by a gray trailing pixel. A similar process is applied for scanlines as well. The series of signals are recombined to effectively control the voltage and current levels of a laser driver.

U.S. Pat. No. 4,544,922 to Watanabe et al. teaches a smoothing circuit for an orthogonal matrix display. The circuit adds or removes a "small dot" on the display from either the first or last third of a dot clock (DCK) period which is one-third the period in which a standard dot of the original pattern is displayed.

U.S. Pat. No. 4,626,923 to Yoshida teaches an image processing apparatus for producing a halftone image in which the on time of the laser is controlled by both the image input data and a pulse width modulation circuit. The image data is transferred under control of clock signal, CLK. The pulse width modulation circuit includes a clock, CLKH, having a frequency three times that of CLK, which is used together with latches and AND gates to provide synchronous sub-pixel addressing.

U.S. Pat. No. 4,661,859 to Mailloux et al. describes an image processing circuit for producing a greyscale image in which the on time of the laser is controlled by both the video input data and the pulse width modulation circuit. The pulse width modulation circuit includes a clock having a frequency greater than the video data rate, which allows synchronous sub-pixel addressing.

U.S. Pat. Nos. 4,847,641 and 5,005,139 to Tung disclose print enhancement circuitry for a laser beam printer. The bit map of a region of the image to be output is compared to a number of patterns or templates. When a match is detected, a section of the bitmap which was matched is replaced with a unique bitmap section designed to compensate for errors. The replacement bitmap section may include predetermined shifting of some dot positions to compensate for the error in the original bitmap section.

U.S. Pat. No. 4,905,023 to Suzuki, describes an image forming apparatus using a plurality of conversion tables addressed by an input video image signal to generate pulses.

U.S. Pat. No. 4,926,268 to Kawamura et al. discloses an image processing apparatus which employs analog circuitry to produce a pulse-width modulated (PWM) output from a multi-level digital signal. As described, each analog signal is generated in synchronism with the pixel clocks.

U.S. Pat. No. 4,933,689 to Yoknis describes a method for enhancing a displayed image in a laser exposed dot matrix format to produce softened edge contours. Using three pulses, a central pulse plus leading and trailing enhancement pulses which are separated therefrom. The purpose of the leading and trailing pulses is to create a blurred or grayed region at the leading and trailing edges of each associated character.

U.S. Pat. No. 4,965,672 to Duke et al. discloses an apparatus for varying the width and position of pulses used to control a laser beam.

U.S. Pat. No. 5,041,848 to Gilbert et al. teaches a non-gray scale anti-aliasing method for smoothing the horizontal components of the edges of an image to be printed by a laser printer having unequal pixel resolutions in the horizontal and vertical dimensions. Working from an ideal outline of the image, the method smooths the edges of the digital outline by selectively modifying the on and off states of pixels on either side of the vertical transition point along the horizontal components at the edges of transition to produce a modified pixel representation.

U.S. Pat. No. 5,134,495 to Frazier et al. discloses a laser based imaging system which employs a resolution transformation method. The method uses the selective activation in overlapping areas between rasters (scan lines). In one embodiment, a single interleaved pixel, between two scan lines, is formed by the sum of up to six laser pulses at pixel points on adjacent scanlines. In some cases the laser pulses are of insufficient intensity to produce a dot or mark at the point on the scanline where the center of the pulse is received.

U.S. Pat. No. 5,138,339 to Curry et al. teaches methods and means for increasing the precision with which optical printers that utilize high gamma recording media, such as xerographic printers, spatially position transitions in the images they print. The invention provides microaddressable display systems for rendering two-dimensional on photo-sensitive media. The microaddressability results from the overscanning of intensity modulated spots which superimpose multiple discrete exposures on the recording medium, wherein the separation of the of the exposure centers is significantly less than the spatial diameter of the spots.

U.S. Pat. No. 5,144,337 to Imamura et al. teaches an image forming apparatus suitable for changing the size of an output dot in a main and subscanning direction. Dot size and shape are controlled by pulse width modulation and power modulation applied to a laser diode.

U.S. Pat. No. 5,144,338 to Sakano discloses an image recorder which employs a pulse width modulated laser beam to control the recording position on a photoconductive drum. The position (left aligned, centered, or right aligned) and duration (12 ns, 20 ns, 32 ns, or 56 ns) of the pulse within a pixel interval is determined based upon the tone level of the pixel of interest and its relation to the tone levels of both preceding and following pixels.

U.S. Pat. No. 5,184,226 to Cianciosi describes a digital system for generating pulses from a series of data words, the relevant portions of which are hereby incorporated by reference. The system employs multiple RAM look-up tables for translating the data words into a series of corresponding pulses utilizing two channels to achieve the desired throughput.

U.S. Pat. No. 5,193,008 to Frazier et al. further describes the resolution enhancement apparatus as one which includes the ability to rasterize the image to be printed at twice the resolution of the printer. The printer then outputs the higher resolution image using an interleaving technique which generates developable dots between scan lines by energizing corresponding dots on adjacent scanlines at a level which will not be developed, but where the overlapping portion of the two corresponding dots will be developable.

U.S. Pat. No. 5,193,011 to Dir et al. discloses a system for printing gray levels without the need of a halftone cell. The system determines the pulse width for each pixel as a function of the gray level of the pixel, based upon an iterative comparison to an incrementing grey level clock. In one embodiment, a page-wide liquid crystal shutter is used to regulate the exposure of a photoconductive drum. The shutter may be toggled on and off multiple times for each pixel during the recording of a single row of the image.

U.S. Pat. No. 5,223,857 to Loce et al. describes a pulsed imaging ROS which utilizes pulse width modulation in conjunction with spatial filtering to form three exposure levels on a photoresponsive surface, each level being associated with a specific development color.

EP-A-361,538 by Goertzel et al. discloses a system for producing halftone images with sharpness or edge enhancement. The edge enhancement is achieved by employing a high resolution output device to print out halftone cells resulting in lower resolution "grey" blocks in stead of just black or white output.

L. Steidel in "Technology Overview: Resolution Enhancement Technologies for Laser Printers", LaserMaster Corp., discusses three currently available implementations for vertical resolution enhancement, Resolution Enhancement Technology, Paired Scan Line Scheme, and TurboRes. In all cases, the horizontal resolution of the laser scanner is increased by increasing the clock speed. On the other hand, the vertical resolution is enhanced by combining the weaker laser laser energy from a brief laser flash, which leaves only residual or fringe energy on the image drum at the periphery of a pixel of an adjacent pixel on a second scan line.

A preferred technique, capable of higher spatial resolution, is to use similar optical elements as the flying spot scanner (rotating polygon, laser light source, pre-polygon and post-polygon optics), but with an acoustooptic (A/O) modulator which illuminates many pixels at a given time, resulting in a scanner with a coherent imaging response. With this type of scan system, the exposure level, or levels at the image surface, can be controlled by controlling the drive level of the A/O modulator dependent on the video data. In a tri-level system, two drive levels are used, one for the white exposure and a second higher drive level for the DAD, or highlight color, exposure.

Instead of obtaining an intermediate exposure level by controlling the acoustic amplitude, an intermediate exposure may be produced using pulse width modulation in a pulsed imaging system in conjunction with spatial filtering. Using an intuitive, or conventional approach to pulsed width modulation, in which the pulses are centered on the pixels, not only leads to color text and graphics in output prints that may have a "bloated" or bolded appearance, but also reproduces what are commonly referred to as "jaggies" when digitized images are printed. Most often, the jaggies are visible along the edges of angled or curved lines, and along characters produced with rasterized fonts. According to one aspect of the present invention, and in a preferred embodiment, the jaggies problem is eliminated for DAD developed regions (i.e., angled or curved edges of highlight color regions) by extending or increasing the width of white or intermediate level video pulses, used to produce neighboring pixels. The exposure level which results from the widened intermediate pulses has the effect of extending the edge of the DAD region by an amount proportional to the amount that the pulse is extended, thereby reducing the jaggedness along the edge of the DAD region.

In accordance with the present invention, there is provided a method for enhancing a discharged area developed region on a photoresponsive member in a pulsed imaging, pulse width modulated printing system capable of creating tri-level images on the photoresponsive member, where a color pixel is produced in response to a video pulse that is on for a full pixel period and a background pixel is produced in response to a video pulse that is on for an intermediate portion of a pixel period. The enhancement method comprises the steps of: converting a series of data words representing image pixels into a series of composite analog video pulses corresponding to a plurality of pixel periods, each pixel period having a composite video pulse representing a charged image area, discharged image area, and intermediate discharged image area to be formed on the surface of said photoreceptor member, said composite video pulses being applied to an acoustooptic modulator to modulate a laser beam used to expose regions of the photoresponsive member; identifying a subset of the data words to be altered so as to improve the appearance of the discharged area developed regions of the output image; and altering a selected data word within the subset by modifying the video pulse corresponding to the selected data word.

In accordance with another aspect of the present invention, there is provided a discharged area development enhancement apparatus for enhancing the discharged area developed regions in a pulsed imaging, pulse width modulated printing system capable of creating tri-level images on a photoresponsive member, where a color pixel is produced in response to a video pulse that is on for a full pixel period and a background pixel is produced in response to a video pulse that is on for an intermediate portion of a pixel period. The enhancement apparatus includes: an acoustooptic modulator to modulate a laser beam used to expose regions of the photoresponsive member; means for converting a stream of video data into composite analog video pulses having uniform pixel periods, each pixel period defining a composite video pulse representing a charged area, discharged area, and intermediate discharged area to be formed on the surface of said photoreceptor member, said composite video pulses being applied to the acoustooptic modulator; means, responsive to the stream of video data, for identifying a subset of data therein to be altered so as to improve the appearance of the discharged area developed regions of the output image; and means for altering the video data for a selected pixel within the subset by modifying the video pulse corresponding to the selected pixel.

BRIEF DESCRIPTION OF THE DRAWINGS

FIGS. 2A–2C illustrate the responses of a xerographic printing system employing discharged area development;

FIGS. 3A–3D are graphical representations of line density versus distance for a xerographic printing system employing discharged area development to produce the line;

FIG. 10A and 10B are schematic illustrations of pulses utilized in the instant invention.

Figure 1:
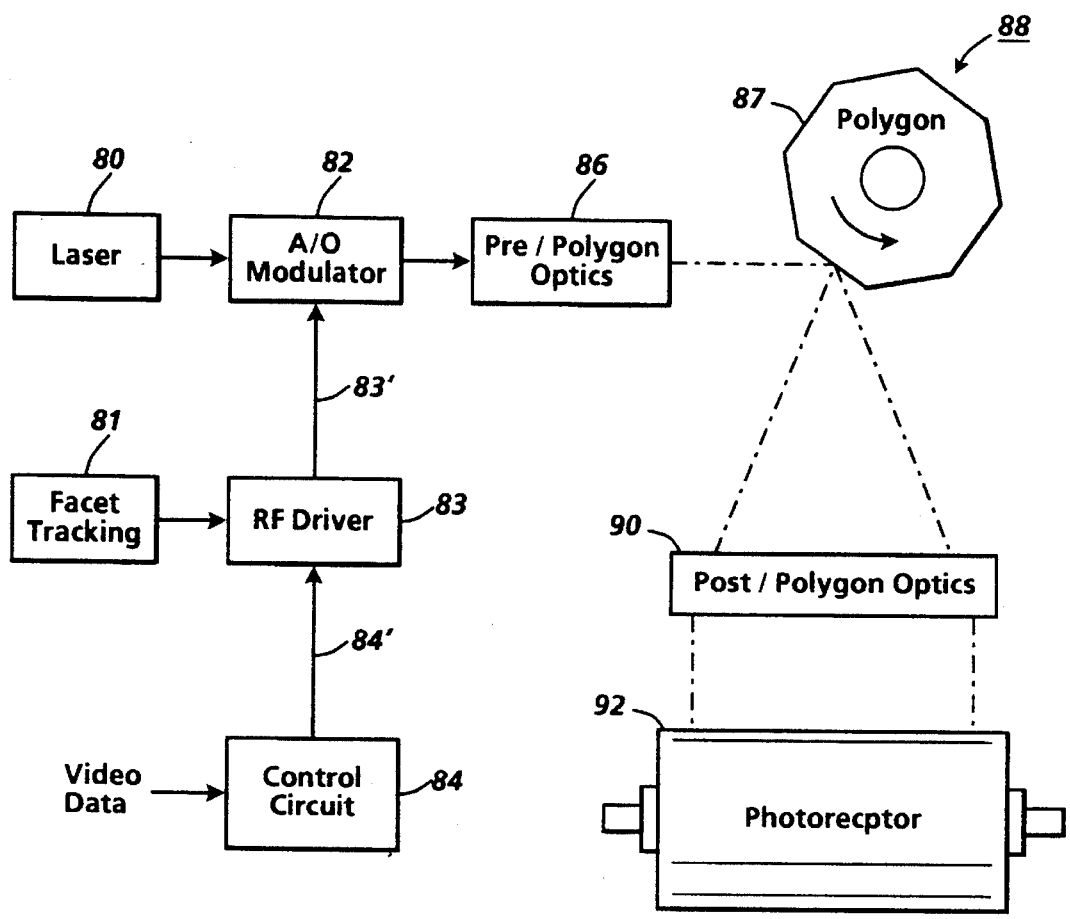
FIG. 1 is a schematic view of a pulsed imaging pulse width modulation, facet tracked raster output scanning (ROS) system.

The present invention will be described in connection with a preferred embodiment, however, it will be understood that there is no intent to limit the invention to the embodiments described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In the description to follow, the reference to color pixels or color development is generally understood to be directed toward the production of a highlight color mark on an output medium. There are two common types of ROSs, flying spot and pulsed imaging ROSs. As used herein, the terms "data" or "data word" are intended to describe one or more digital signals used to represent an image, such as video signals. Moreover, the term "video data" is used to denote electrical signals which carry image information for one or more picture elements, or pixels.

FIG. 1 shows a pulsed imaging, pulse width modulation, facet tracked ROS system, according to a first aspect of the present invention. A focused beam of light from a laser 80 is applied to acoustooptic (A/O) modulator 82. A control circuit 84 converts an image bitmap video data stream into an analog video data stream consisting of a plurality of pixel periods, each period having a signal content representing charged area (black), discharged area (color) and intermediate discharged (white) to be formed on the surface of photoreceptor 92. Circuit 84 controls the drive level of modulator 82. The light output profile emerging from modulator 82 is defined by the overlap of the acoustic pulses and the illuminating light beam from laser 80 and enables individual acoustic pulses to be imaged onto photoreceptor 92. In the fast scan direction, the anamorphic prepolygon optics 86 performs a Fourier transformation of the optical pulses exiting the A/O modulator, and projects the Fourier profile onto facets 87 of rotating polygon 88. The polygon is placed at the back focal plane of the post polygon optics 90 and the front focal plane of the prepolygon optics 86. The frequency of the rf used to excite the modulator is swept in synchronism with the scanning across the photoreceptor by means of facet tracking circuit 81 and rf driver circuit 83 so that the Fourier profile remains centered on the facets 87 of the rotating polygon 90. The size of the zero-order spot at the facet is dependent on, and is inversely proportional to, the size of the beam in the modulator, with the diffracted orders also exhibiting this same proportionality.

As polygon 88 rotates, the optical image of the acoustooptic video pattern is swept across the surface of photoreceptor 92, after passing through post polygon optics 90. Acoustic image motion at the photoreceptor surface which, if uncorrected, would blur the optical image, is cancelled by balancing the acoustic and scan velocities with the prepolygon and postpolygon optics magnification, resulting in the acoustic image remaining stationary on the photoreceptor. The imaged line is exposed at three exposure levels, zero, intermediate and full. The intermediate (white) exposure level is obtained from the pulse width narrowed video signals which become spatially narrow optical pulses exiting the modulator 82 and are filtered by facets 87 to result in a low uniform exposure at the photoreceptor 92.

Typically, the video data used to drive the ROS is clocked so that the period within which each pixel is exposed, referred to hereafter as a pixel clock period, is the same. In addition, the video data used to generate the video signal pulses which drive the modulator are also synchronized with ROS 18 and the movement of the image plane 32 in the slow scan direction, thereby allowing a particular bit of video data to address an appropriate portion of image plane 32. The synchronization of the video data, the video pulses produced therefrom, the ROS, and the image plane is achieved through the use of a system clock that is equivalent to the rate at which pixels must be exposed on the image plane. While faster clocks may allow greater resolution within the video pulse stream, a higher frequency also results in increased costs for faster hardware within the video processing path. Accordingly, the present invention seeks to provide enhanced images without the need for increased clock frequency.

FIGS. 2A–2C and 3A–3D, as will be hereinafter described, are intended to represent the response of a xerographic system to medium exposures falling between an intermediate or background (white) exposure level and a full (color) exposure. While it is acknowledged that xerography does not produce large areas of medium exposures well, it does respond in a stable and characterizable manner to medium exposure pixels adjacent to fully developed and fully exposed, or binary pixels. For example, FIGS. 2A–2C illustrate how the xerographic process responds to medium exposures when those exposures are adjacent to pixels that are fully exposed (i.e., a color pixel in a color DAD system). More specifically, FIG. 2A illustrates a 2-pixel wide vertical line, and FIG. 2C illustrates a 3-pixel wide vertical line, both being developed in a highlight color subsequent to full exposure with a ROS. On the other hand, FIG. 2B illustrates the intent of the present invention, that is to utilize a medium exposure pixel to slightly extend the 2-pixel wide color line so as to achieve an intermediate line width. The effect of the medium exposure, illustrated along the right edge in FIG. 2B, is to stretch the edge of the fully developed area partially into the medium pixel. As the medium exposure is varied from white to the fully discharged highlight color, the edge is shifted further into the medium pixel area. Thus, medium exposures adjacent to fully exposed and developed regions provide a means to produce a series of line widths intermediate to the single pixel addressability of the imager.

Correspondingly, the line density representations of FIGS. 3A–3D illustrate the phenomena relied upon with respect to FIG. 2B. FIGS. 3A and 3D illustrate the toner density curves for the 2- and 3-pixel wide color lines illustrated in FIGS. 2A and 2C, respectively. FIG. 3B illustrates the charge density that would be created on the photoreceptor by the ROS to produce a 2-pixel wide color line with an adjoining medium pixel along the right side thereof. On the other hand, FIG. 3C illustrates the blurring effect or response of the xerographic system to the charge density profile of FIG. 3B, where the intermediate exposure of the medium pixel region along the right side effectively extends the edge of the 2-pixel wide color line to the right, shown as the developed toner density representation of FIG. 3C.

Figure 4C:
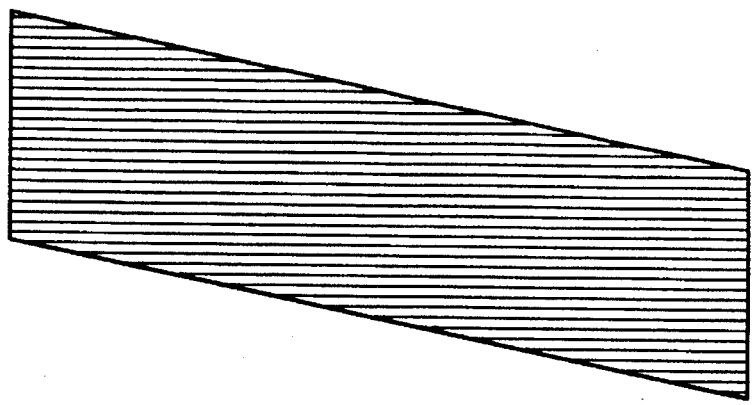
FIGS. 4A–4C illustrates an application of the present invention to produce medium exposures which are used to smoothly print jagged edges present in digitized images.
Figure 4B:
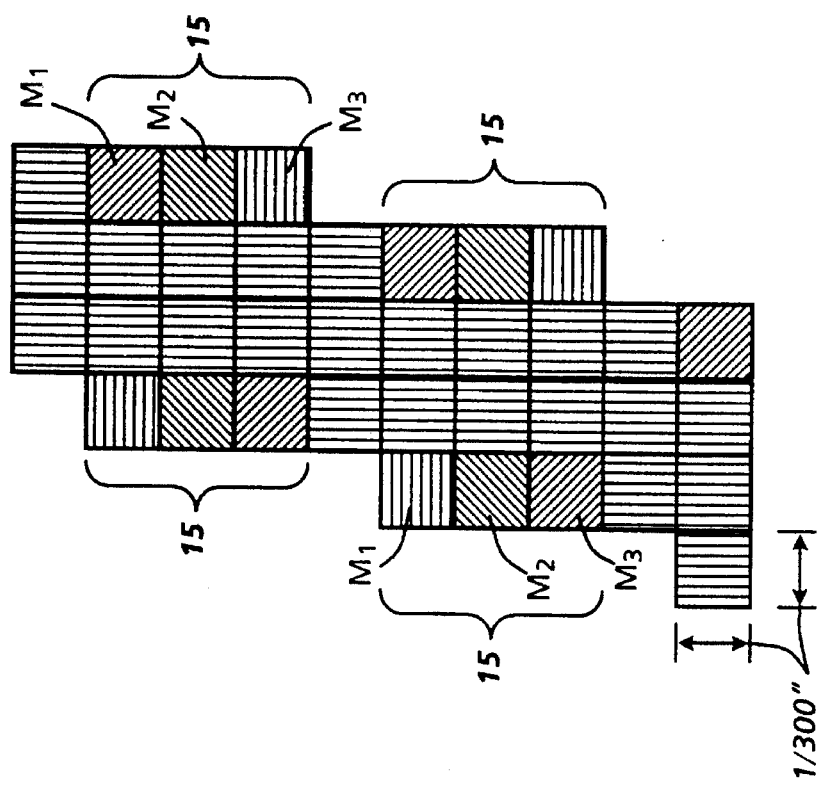
Figure 4A:
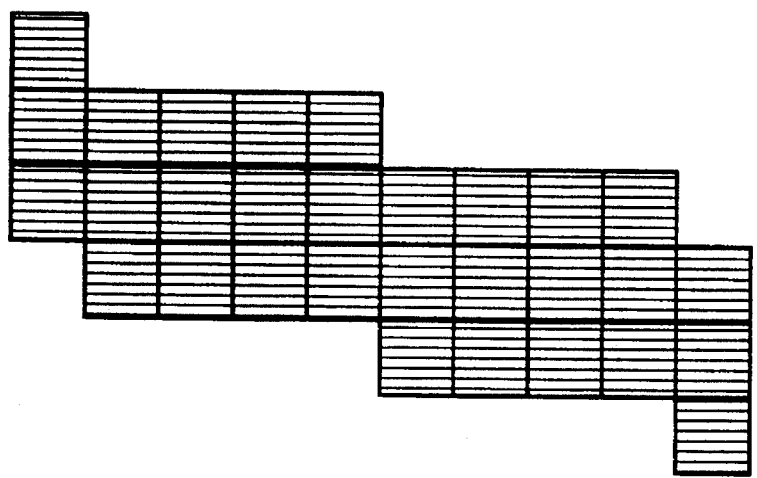

Employing the known imaging response of the xerographic system to a medium exposure level, FIGS. 4A–4C illustrate how the medium exposures can be used to smooth the jagged edges present in typical 300 spi printing systems. As will be hereinafter described, medium exposures (M) are used to move the line edge by ¼ ($M_1$), ½ ($M_2$), and ¾ ($M_3$) of a pixel. For example, given the digitized image of a sloped line, as illustrated in an expanded view by FIG. 4A, the present invention would seek to enhance the output of the line so as to smooth the jagged edges thereon. To accomplish the smoothing of the edges, the present invention would monitor the image data which is to be printed to identify the presence of "jaggies" within the stream of image signals. Subsequently, medium exposure pixels of varying levels would be added to the jagged regions indicated by reference numeral 15 in FIG. 4B to slightly extend or contract the edge of the sloped line in specific regions. Thus, where maximum extension of the edge is needed, a medium exposure level $M_3$ will be produced for that pixel position, and where only slight extension of the edge is needed, a medium exposure level $M_1$ will be used. Then, the xerographic process will merge or blur the medium level pixels to produce a sloped line edge like that shown in FIG. 4C.

Figure 5:
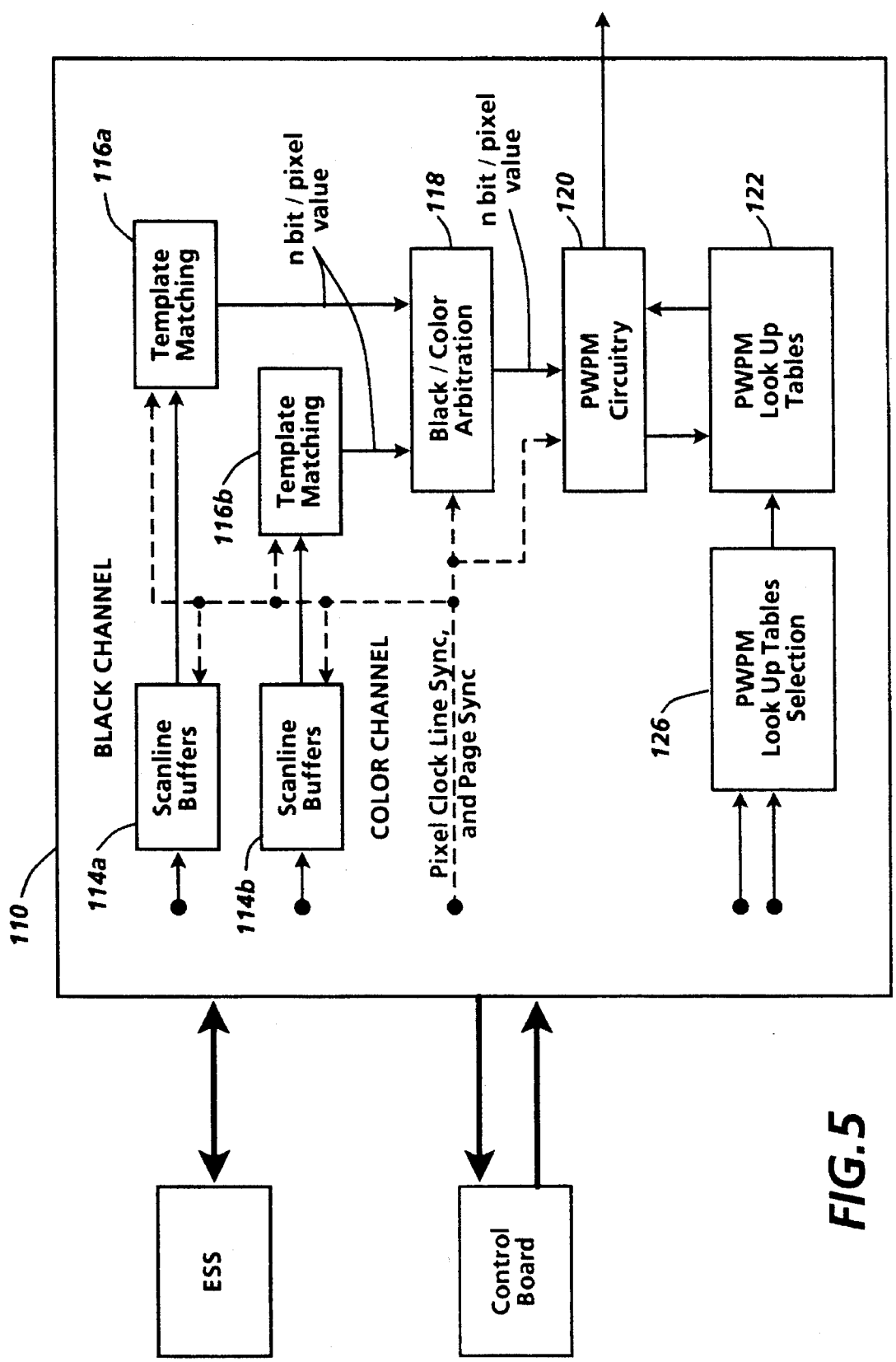
FIG. 5 is a block diagram illustrating the components of an image enhancement embodiment incorporating the present invention.

Turning now to FIG. 5, the system used to accomplish the previously described steps will be described. In the present embodiment, a pulse width, position, and amplitude modulator (pulse modulator) is utilized to form the video pulses in response to video data representing the image to be printed. The width and position of a pulse within a pixel clock period Δ may be varied with separate, independently variable delays for the leading edge and trailing edge of the pulse, as described in U.S. patent application Ser. No. 08/118,858, the relevant portions of which are hereby incorporated by reference. In a normal operating mode, a pulse would be generated in response to information in a corresponding data word, as disclosed in U.S. Pat. No. 5,184,226 to Cianciosi, issued Feb. 2, 1993, the relevant portions of which are hereby incorporated by reference.

The architecture of an image enhancement board 110 which carries out the previously described aspects of the present invention will now be described with reference to FIG. 5. The primary functions of image enhancement board 110 are to: 1) provide scanline buffers for image data, 2) carry out template matching on the buffered data, 3) provide arbitration circuitry, 4) enable PWPM table look-up selection circuits, and 5) provide PWPM electronics to generate the required video pulses to drive the acoustooptic modulator 82 of FIG. 1. Note that there are two channels present on image enhancement board 110, one to handle the black image information and the other to handle the color image information. Each channel is processed independently, recognizing that, by design, the input video would not have the redundant state where a pixel was listed as black and highlight color.

Figure 6A:
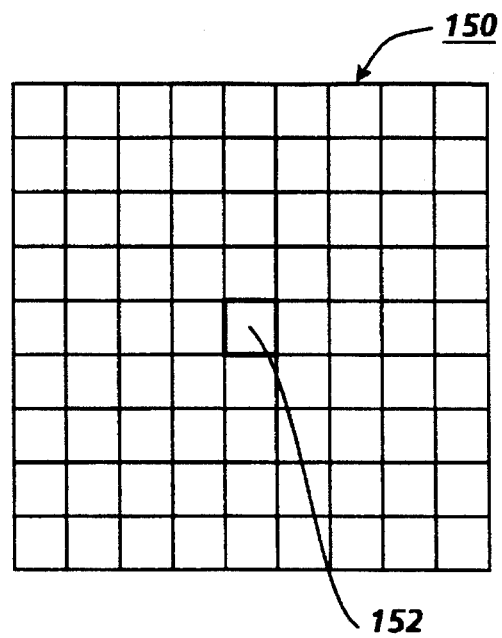
FIG. 6A is a schematic representation of an array of pixel locations employed by the present invention in a template matching operation.
Figure 6B:
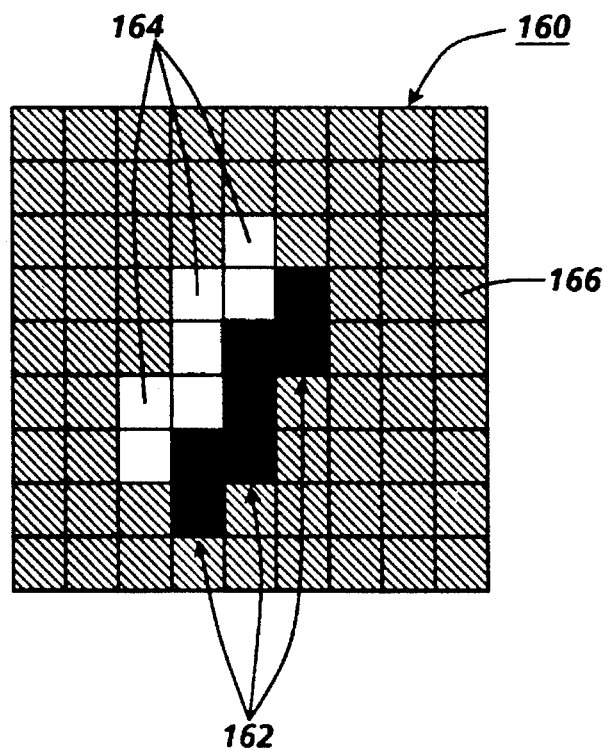
FIG. 6B is a schematic representation of an example of a template used in a preferred embodiment of the present invention.

Scanline buffers 114a, b serve the purpose of storing complete scanlines or rasters of video data, preferably nine scanlines, or possibly ten scanlines so that nine may be used while the next scanline is being loaded into the tenth scanline buffer. From the scanline buffers, eighty-one pixels in a 9×9 square matrix are input to template matching blocks 116a and 116b. In a preferred embodiment, the functionality of template matching blocks 116a, b would be provided by an application specific integrated circuit (ASIC). Referring to FIGS. 6A and 6B, within the template matching blocks, the video data representing the 9×9 array of pixels 150 surrounding a selected central pixel 152 are compared against a predefined set of templates, for example the template of FIG. 6B, to determine if the current pixel pattern for the color image (i.e., from buffer 114b) matches one of the templates in the set.

Many techniques are available for identifying the regions of a digitized image which require image enhancement to eliminate half-bitting so as to more accurately replicate curved or diagonal edges within an image. The present invention utilizes a set of predefined templates to search for areas having a requisite set of "on" and "off" pixels within at least a portion of the 9×9 region 150. More specifically, the template matching blocks compare the required "on" or color pixels 164 within array 160, illustrated in FIG. 6B as darkened pixels to the corresponding pixel positions in the image array 150. Assuming all the required "on" pixels of the template have corresponding matches, the "off" or white pixels, represented by reference numeral 164 and shown as white spaces, are then compared in a similar fashion. In FIG. 6B, the shaded pixel positions, for example position 166, represent "don't care" positions where the output level of the pixel is of no importance to the comparison. If no template match is identified, the output of the ASIC in template matching block 116 is set to 0 when the central pixel is white, and is set to 1 if the incoming pixel were black or color. This preserves the level (black or color) of the input image in a non-match situation.

Assuming that a template is matched, a code is generated and output from template matching blocks 116a or 116b to specifically identify the way that the central pixel, pixel 152 is to be imaged. To produce the five possible output levels depicted in FIG. 4B, a 3-bit value would be output from the template matching blocks. For example, the output codes could be as follows: 000 h for a white pixel; 111 h for color; 001 h for $M_1$; 010 h for $M_2$; and 011 h for $M_3$.

Each channel on the image enhancement board is processed independently. As a result, there will be cases where both the black and color channels assign a value to the same pixel. This situation is resolved within the arbitration block 118. In one embodiment, the arbitration circuitry may be a look-up table that takes as its two inputs the codes output by the two template matching blocks, 116a, b. In practice, the function of the arbitration block would be to enable the black output (zero exposure) while disabling the color output (full exposure) in light of the fact that a color spot would not be visible in a black region. However, it is possible that, in certain applications, the arbitration block may be required to enable the output of a color pixel The PWPM circuitry, block 120, produces the video signals that drive the acoustooptic modulator (not shown) as described in U.S. patent application Ser. No. 08/118,858. From modeling and printing characterizations, the pulse characteristics, widths and positions, necessary to achieve the desired exposures are determined and preloaded into translating means represented by PWPM look-up tables 122 which are used to translate the pixel codes into pulse characteristics. As embodied herein, the translating means comprises four RAM look-up tables, and each code word represents an address therein. In a preferred embodiment, a pair of 256×4 ECL RAM look-up tables are used to generate a pulse attribute word for each pulse attribute sought to be controlled. More specifically, PWPM circuitry 120 sends the code to look-up table 122 and in return receives signals which are indicative of the corresponding pulse width, position and state (inverted or normal). In one embodiment, the width and position may be characterized as a pair of timing delays which specify the beginning and end of the pulse with respect to a pixel period. In addition, the embodiment illustrated in FIG. 5 further allows for two or more sets of PWPM look-up tables, wherein the look-up table to be used is selected in response to external signals which are interpreted by PWPM look-up table selection block 126. Once generated by the PWPM circuitry of block 120, the video pulse is sent to acoustooptic modulator 82 as illustrated in FIG. 1.

Figure 7A:
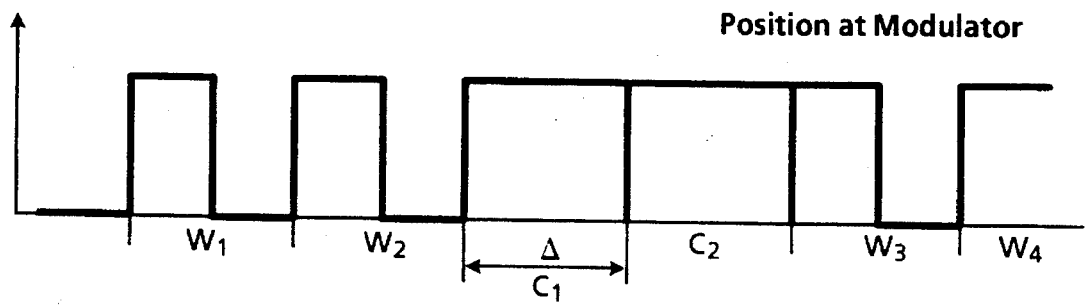
FIGS. 7A–7C are graphical illustrations of separations for electric field distributions of a 2-pixel wide highlight color (e.g., red) line on a white background, produced using a well-known tri-level printing process.
Figure 7B:
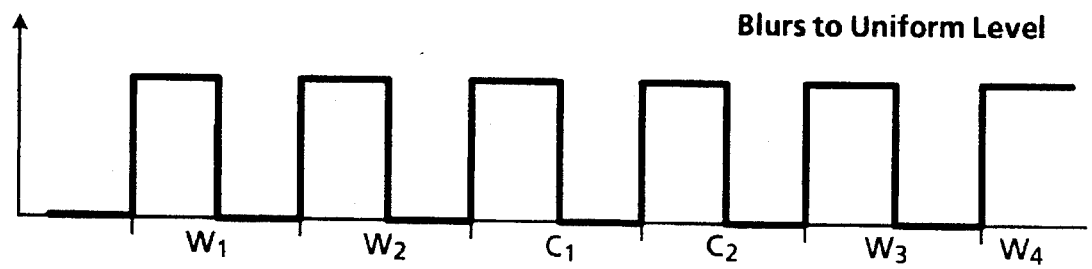
Figure 7C:
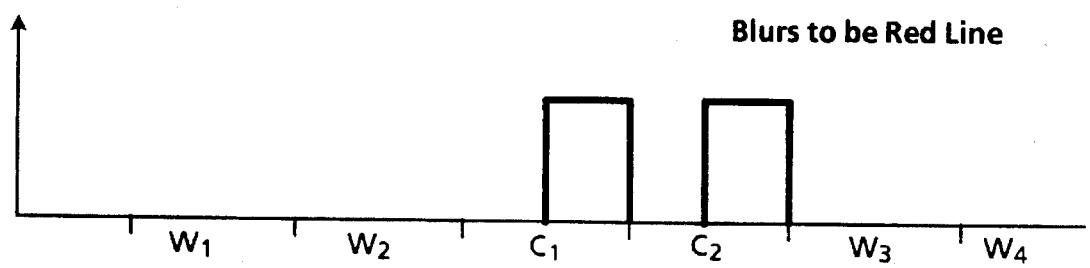

As shown by the schematic illustrations of FIGS. 7A–7C, it is possible, at least conceptually, to represent the video signal used to drive the acoustooptic modulator as a series of additive parts. For example, FIG. 7A represents the video signals or pulse train necessary to produce a two pixel wide color (e.g., red) line which runs perpendicular to the fast scan imaging direction. The pulses are shown positioned within successive uniform pixel periods having a width Δ. Hence, for a DAD system pixel positions $C_1$ and $C_2$, represent color pixels (full exposure within the pixel period) and pixels $W_1$–$W_4$ represent white pixels (intermediate exposure, on for approximately one-half pixel period). As alluded to, the signals of FIG. 7A may be conceptually split into two additive parts; a periodic part that gets filtered or blurred by the spatial filtering characteristic of the ROS to produce a uniform intermediate exposure level, as represented by FIG. 7B, and a positive part that is blurred to form the color line by addition to the periodic part within the region of pixel positions $C_1$ and $C_2$. Applying the same analysis method, the techniques used to form the medium exposure pixels of the present invention are illustrated in the remaining figures.

In an embodiment of the present invention, the pulses used to produce the modified gray or intermediate exposure as a result of the template match are produced by extending the width, or duty cycle, of the pulses used to produce the white pixels that are adjacent to, or neighboring, the color pixels of the line. Similarly, the portion of video pulse associated with the color exposure could be reduced, again producing a medium exposure level less than full exposure. While acknowledging that the modification of the color and white pulses are distinct alternatives, the resultant video pulse streams are equivalent in that both produce medium levels of exposure. The difference being that extending the width of the white pixel pulse extends the neighboring colored region by an intermediate amount, and reducing the the width of the pulse for the colored pixel reduces the colored area by an intermediate amount.

Figure 8A:
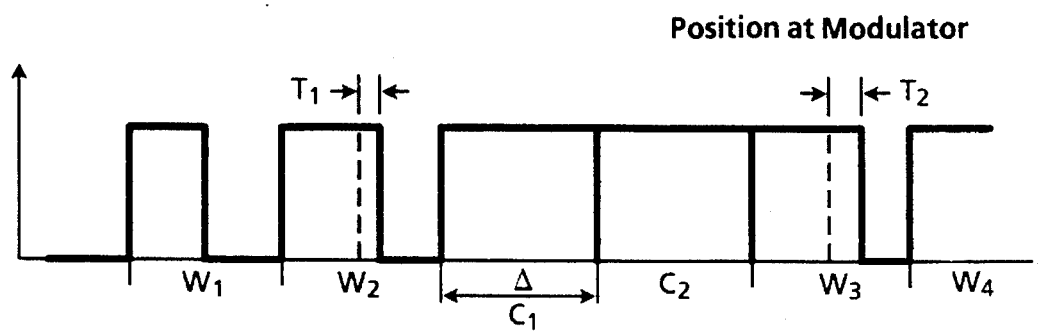
FIGS. 8A and 8B are graphical illustrations of electric field separations depicting one embodiment of the present invention for producing medium level pixels.
Figure 8B:
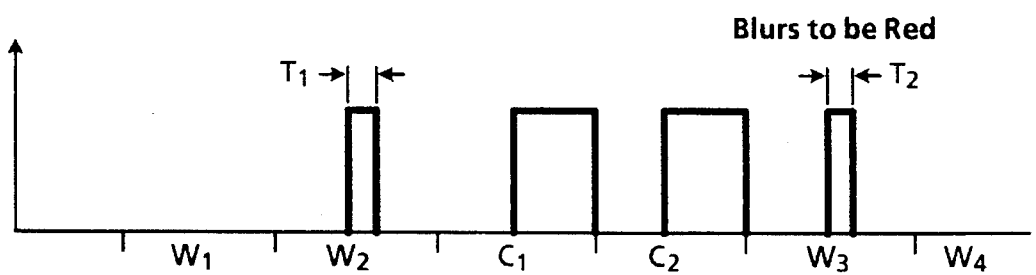

As illustrated in FIG. 8A, the white exposure pulses, $W_1$–$W_4$, are preferably justified at the beginning of the pixel periods. Thus, the extension of the white exposure pulse may be accomplished by adding to the width of the pulse on a trailing edge to expose the adjacent white pixels, $W_2$ and $W_3$, by the additional amounts indicated by $T_1$ and $T_2$, respectively. The result of the extension is a medium level of exposure which effectively extends the width of the line as a result of the additional exposure in pixel periods $W_2$ and $W_3$, as illustrated by the corresponding separation shown in FIG. 8B. By varying the amount of extension of the white exposure pulse (T), and relying on the previously described response of the xerographic system to intermediate exposure levels, the added positive separation illustrated in FIG. 8B is blurred to produce a color line having a width slightly greater than two pixels wide. Thus, in response to the template match, the video pulses are generated to slightly extend the edge of, or widen, the color or discharged area developed regions of the output image. Furthermore, the amount that the edges are extended is dependent upon the particular template that was matched, so as to enhance the edges of the regions and eliminate a jagged appearance.

As illustrated in FIG. 10A, the width and position of a pulse 52 within a pixel clock period 54, referred to previously as Δ, may be varied with separate, independently variable delays for the leading edge 56 and trailing edge 58 of the pulse 52. A leading edge delay 56 is defined from the beginning of a pixel period 60 to the leading edge of the pulse 50. A trailing edge delay 58 is defined from the beginning of a pixel period 60 to the trailing edge of the pulse 62. In a normal operating mode, pulse 52 would be generated in response to information in a corresponding data word, as disclosed in U.S. Pat. No. 5,184,226 to Cianciosi, issued Feb. 2, 1993, the relevant portions of which are hereby incorporated by reference.

Figure 9A:
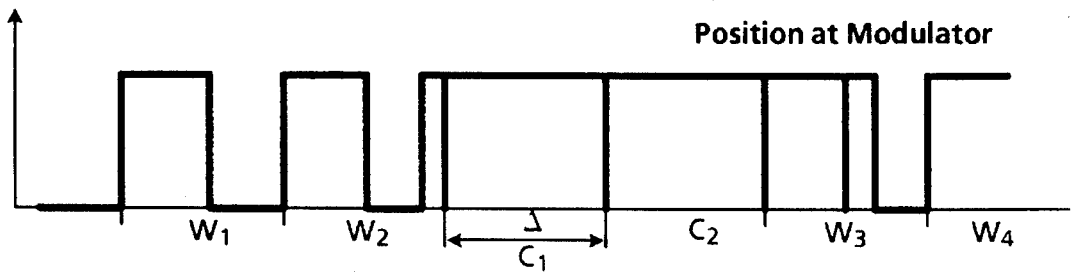
FIGS. 9A and 9B are graphical illustrations of electric field separations depicting another embodiment of the present invention which produces medium level pixels.

In a preferred embodiment, the pulses used to produce the medium exposure as a result of the template match are again represented as modifying the exposure of white or intermediate pixels adjacent to the color pixels. In this embodiment, however, the intermediate exposures are produced by extending the total exposure pulse within the white pixel periods by adding a second pulse ($S_1$) within a pixel period, as illustrated in FIG. 9A. Distinguished from the pulse extension method of FIG. 8A, the preferred embodiment adds the the extension along the portion of the pulse used to form the color line. This results in a more symmetric growth of the line as compared to the embodiment depicted in FIG. 8A.

More specifically, the extension pulse $S_1$ is justified at the end of pixel period $W_2$, to make it adjacent the pulse extending completely across period $C_1$. On the opposite side of the 2-pixel wide line, the extension pulse $S_2$, is added at the end of the partial (approx. one-half period) pulse used to provide the intermediate exposure level. Once again, because of the capability of controlling the position and width of the video pulse, and the possibility of inverting the pulse (FIG. 10A) to produce a pair of complimentary pulses (FIG. 10B) as described in U.S. patent application Ser. No. 08/118,858, the pulse characteristics output from the PWPM look-up tables of FIG. 5 produce medium exposure levels. As illustrated in FIG. 10B, complimentary or inverted pulses, 70 and 72, would be justified to the respective pixel clock boundaries, 60 and 61. Furthermore, the medium exposure level would be inversely proportional to the inactive period between complimentary pulses 70 and 72.

Figure 9B:
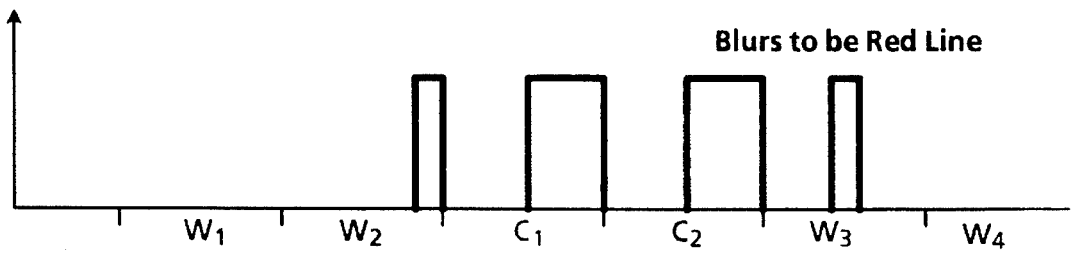

As previously described, the medium exposure levels, lying between the intermediate exposure necessary for no development and the full exposure necessary for discharged area development (DAD), result in widening of the regions where color marking particles are developed in the DAD system, as represented by the separation part of FIG. 9B. In FIG. 9B, the width of the narrow pulses within pixel positions W2 and W3 represent the amount added to the intermediate exposure level used to produce white pulses in the tri-level development system.

In recapitulation, the present invention is an apparatus for enhancing the output along edges of discharged area developed regions in a tri-level imaging system employing a pulse width and position modulated ROS for exposure. The invention enables the identification and selective alteration of video signals used to drive the ROS so as to extend the developed regions by a selected amount and eliminate digitization artifacts present in the image to be printed. The extension of the discharged area developed regions is accomplished by extending the width of, or adding separate, exposure pulses in adjacent areas to enable development within a portion of those regions. In a similar manner, the area of the discharged area developed region may be reduced by treating a "full on" pixel as an intermediate level, or white, pixel with an additional pulse that may be reduced in width.

It is, therefore, apparent that there has been provided, in accordance with the present invention, a method and apparatus for enhancing discharged area developed regions in a tri-level printing system. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. In a pulsed imaging, pulse width modulated printing system for creating tri-level images on a photoresponsive member, where a color pixel is produced in response to a video pulse that is on for a full pixel period and a background pixel is produced in response to a video pulse that is on for an intermediate portion of a pixel period, a method for enhancing a discharged area developed region on the photoresponsive member, comprising the steps of:

converting a series of data words representing image pixels into a series of composite analog video pulses corresponding to a plurality of pixel periods, each pixel period having a composite video pulse representing a charged image area, discharged image area, and intermediate discharged image area to be formed on the surface of said photoreceptor member, said composite video pulses being applied to an acoustooptic modulator to modulate a laser beam used to expose regions of the photoresponsive member;

identifying a subset of the data words to be altered so as to improve the appearance of the discharged area developed regions of the output image; and altering a selected data word within the subset by modifying a video pulse corresponding to the selected data word.

2. The method of claim 1, wherein the step of identifying a subset of data words to be altered comprises the steps of:

storing a plurality of said data words representing image pixels in memory, said stored data words being selected from data words representing a neighborhood of pixels surrounding a pixel associated with the selected data word;

comparing the stored data words to a template set, wherein each template within said set has a predefined arrangement of data; and when the stored data words match one of the templates within the predefined template set, identifying the selected data word as a member of the subset of data words to be altered so as to improve the appearance of the output image.

3. The method of claim 2, wherein the comparing step comprises the steps of:

comparing the data words at template positions requiring a first signal level to corresponding positions in the stored data words;

comparing the data words at template positions requiring a second signal level to corresponding positions in the stored data words; and only when matches for the positions first and second signal levels are present within the stored data words, signaling that the selected data word is to be altered.

4. The method of claim 1, wherein the altering step comprises the steps of:

producing a video pulse wider than an intermediate pulse; and applying the wider video pulse applied to the acoustooptic modulator so as to change the level of exposure for the selected pixel, thereby producing a medium exposure level greater than intermediate exposure and less than full exposure.

5. The method of claim 4, wherein the video pulse is widened by extending a first edge thereof.

6. The method of claim 5, wherein the first edge is a trailing edge of the video pulse.

7. The method of claim 1, wherein the altering step comprises the step of producing a pair of video pulses applied to the acoustooptic modulator within a selected pixel period so as to change the level of exposure for the selected pixel period, thereby producing an exposure level greater than intermediate exposure and less than full exposure.

8. The method of claim 7, wherein the step of producing a pair of video pulses comprises the steps of:

specifying a leading edge delay for a first pulse to be generated during the selected pixel period;

specifying a trailing edge delay for the first pulse to be generated during the selected pixel period;

generating the first pulse during the portion of the selected pixel period between the leading edge delay and the trailing edge delay; and inverting the first pulse to produce the pair of pulses within the selected pixel period.

9. The method of claim 8, wherein said inverting step comprises the steps of:

justifying a leading edge of the first of said pair of pulses at the beginning of the pixel period; and justifying a trailing edge of the second of said pair of pulses at the end of the pixel period.

10. An apparatus for enhancing the discharged area developed regions in a pulsed imaging, pulse width modulated printing system capable of creating tri-level images on a photoresponsive member, where a color pixel is produced in response to a video pulse that is on for a full pixel period and a background pixel is produced in response to a video pulse that is on for an intermediate portion of a pixel period, including:

an acoustooptic modulator to modulate a laser beam used to expose regions of the photoresponsive member;

means for converting a stream of video data, representing a plurality of pixels, into composite analog video pulses having uniform pixel periods, each pixel period defining a composite video pulse representing a charged area, discharged area, and intermediate discharged area to be formed on the surface of said photoreceptor member, said composite video pulses being applied to the acoustooptic modulator;

means, responsive to the stream of video data, for identifying a subset of video data therein to be altered so as to improve the appearance of the discharged area developed regions of the output image; and means for altering the video data representing a selected pixel within the subset by modifying the video pulse corresponding to the selected pixel.

11. The apparatus of claim 10, wherein said identifying means includes:

a predefined set of templates, each template therein representing a particular arrangement of video data;

memory for storing video data corresponding to a center pixel and a plurality of neighboring pixels surrounding the center pixel; and means for comparing the stored video data to the data in the predefined set of templates to indicate when the stored video data matches one of the templates, thereby identifying the video data corresponding to the center pixel as a member of the subset of video data to be altered so as to improve the appearance of the output image.

12. The apparatus of claim 11, wherein said comparing means includes:

first matching means for successively comparing template pixel positions requiring a background video data level to the stored video data for corresponding pixel positions and indicating a match with a first matching signal;

second matching means for successively comparing template pixel positions requiring a discharged video data level to the stored video data for corresponding pixel positions and indicating a match with a second matching signal; and means, responsive to the presence of the first and second matching signals, for signaling that the video data corresponding to the center pixel is to be altered.

13. The apparatus of claim 10, wherein said altering means includes means for widening the video pulse applied to the acoustooptic modulator so as to change the level of exposure for the selected pixel, thereby producing an exposure level greater than intermediate exposure and less than full exposure.

14. The apparatus of claim 13, wherein said widening means extends a first edge of the video pulse.

15. The apparatus of claim 14, wherein the first edge is a trailing edge of the video pulse.

16. The apparatus of claim 10, wherein said altering means includes means for producing a pair of video pulses to be applied to the acoustooptic modulator within a selected pixel period so as to change the level of exposure for the selected pixel, thereby producing an exposure level greater than intermediate exposure and less than full exposure.

17. The method of claim 16, wherein the means for producing a pair of video pulses includes:

- means for specifying the leading edge delay for a first pulse to be generated during the selected pixel period;
- means for specifying the trailing edge delay for the first pulse to be generated during the selected pixel period;
- means for generating the first pulse during the portion of the selected pixel period between the leading edge delay and the trailing edge delay; and
- means for inverting the first pulse to produce the pair of video pulses within the selected pixel period.

18. The apparatus of claim 17, wherein:

- a leading edge of the first of said pair of pulses is justified at the beginning of the pixel period; and
- a trailing edge of the second of said pair of pulses is justified at the end of the pixel period.

* * * * *

UNITED STATES PATENT AND TRADEMARK OFFICE
CERTIFICATE OF CORRECTION

PATENT NO. : 5,479,175
DATED : December 26, 1995
INVENTOR(S) : Michael S. Cianciosi et al.

It is certified that error appears in the above--identified patent and that said Letters Patent is hereby corrected as shown below:

TITLE [54]: METHOD AND APPARATUS FOR ENHANCING DISCHARGED AREA DEVELOPED REGIONS IN A TRI-LEVEL PRINTING SYSTEM

Column 1, Line 4, change "PRINGING" to -- PRINTING --.

Signed and Sealed this

Thirtieth Day of April, 1996

Attest:

BRUCE LEHMAN

*Attesting Officer*  *Commissioner of Patents and Trademarks*